US008918271B2

(12) United States Patent
Pendry et al.

(10) Patent No.: US 8,918,271 B2
(45) Date of Patent: Dec. 23, 2014

(54) FLIGHT PLANNING METHODS AND SYSTEMS

(75) Inventors: Steven Pendry, Somerset (GB); Timothy Hood, Dorset (GB)

(73) Assignee: BAE Systems PLC, London (GB)

( * ) Notice: Subject to any disclaimer, the term of this patent is extended or adjusted under 35 U.S.C. 154(b) by 131 days.

(21) Appl. No.: 13/642,748

(22) PCT Filed: Apr. 26, 2011

(86) PCT No.: PCT/GB2011/050822
§ 371 (c)(1), (2), (4) Date: Jan. 8, 2013

(87) PCT Pub. No.: WO2011/132002
PCT Pub. Date: Oct. 27, 2011

(65) Prior Publication Data

US 2013/0131970 A1 May 23, 2013

(30) Foreign Application Priority Data

Apr. 22, 2010 (EP) .................................... 10275046
Apr. 22, 2010 (GB) .................................. 1006677.7

(51) Int. Cl.
*G06F 19/00* (2011.01)
*G08G 5/00* (2006.01)

(52) U.S. Cl.
CPC .............. *G08G 5/003* (2013.01); *G08G 5/0082* (2013.01); *G08G 5/0034* (2013.01); *G08G 5/0043* (2013.01); *G08G 5/0039* (2013.01)
USPC ................ 701/120; 701/3; 701/14; 340/903; 340/945; 340/436; 244/158.1

(58) Field of Classification Search
CPC ... G08G 5/0034; G08G 5/0039; G08G 5/003; G08G 5/0082; G08G 5/0043; G08G 5/00; G01S 17/023; G01S 1/00; G01C 23/00
USPC ............ 701/3, 14, 15, 16, 120; 340/903, 945, 340/436, 439; 244/158.1
See application file for complete search history.

(56) References Cited

U.S. PATENT DOCUMENTS 6,577,947 B1 6/2003 Kronfeld et al.
6,606,553 B2 * 8/2003 Zobell et al. ................. 701/120
(Continued)

FOREIGN PATENT DOCUMENTS

CN 101465064 A 6/2009
FR 2 894 056 6/2007
(Continued)

OTHER PUBLICATIONS

International Search Report and Written Opinion dated Oct. 19, 2011 issued in PCT/GB2011/050822.

(Continued)

*Primary Examiner* — Gertrude Arthur Jeanglaude
(74) *Attorney, Agent, or Firm* — Scully, Scott, Murphy & Presser, P.C.

(57) ABSTRACT

An electronic flight planning system is provided, arranged to implement a preferred method for identifying conflicts between flight plans for aircraft. In the preferred method, the system receives, as data input from one or more users, a plurality of flight plans each defining a flight by an aircraft; the system determines, for each aircraft and its respective received flight plan, a three-dimensional region of potential conflict, representative both of the uncertainty in the position of the aircraft and of a region of air exclusion appropriate for the aircraft or for the respective received flight plan; and the system determines, on the basis of the determined regions of potential conflict, whether one of the received flight plans is in conflict with any of the other received flight plans.

15 Claims, 5 Drawing Sheets

(56) References Cited

U.S. PATENT DOCUMENTS

| | | | | |
|---|---|---|---|---|
| 6,950,037 | B1 | 9/2005 | Clavier et al. | |
| 7,487,039 | B2 * | 2/2009 | Rumbo et al. | 701/528 |
| 8,027,786 | B2 * | 9/2011 | Wipplinger et al. | 701/467 |
| 8,090,526 | B2 * | 1/2012 | Marty et al. | 701/411 |
| 8,160,759 | B2 * | 4/2012 | Baker et al. | 701/16 |
| 8,200,377 | B2 * | 6/2012 | Marty et al. | 701/3 |
| 8,554,457 | B2 * | 10/2013 | White et al. | 701/120 |
| 2006/0089760 | A1 | 4/2006 | Love et al. | |
| 2006/0109166 | A1 | 5/2006 | Arthur et al. | |
| 2006/0259234 | A1 | 11/2006 | Flynn et al. | |
| 2007/0032940 | A1 * | 2/2007 | Villiers | 701/120 |
| 2007/0222665 | A1 | 9/2007 | Koeneman | |
| 2008/0065312 | A1 | 3/2008 | Coulmeau et al. | |
| 2008/0306680 | A1 * | 12/2008 | Marty et al. | 701/201 |
| 2009/0109065 | A1 | 4/2009 | Pinheiro | |
| 2009/0125221 | A1 | 5/2009 | Estkowski et al. | |
| 2009/0319101 | A1 | 12/2009 | Coulmeau | |
| 2010/0049380 | A1 | 2/2010 | Hiale-Guilhamou et al. | |

FOREIGN PATENT DOCUMENTS

| | | | |
|---|---|---|---|
| FR | 2 905 505 | | 3/2008 |
| FR | 2 923 008 | | 5/2009 |
| JP | 2002-117500 | | 4/2002 |
| WO | WO 2004/102505 | A2 | 11/2004 |
| WO | WO 2005/079179 | A1 | 9/2005 |
| WO | WO 2007/072015 | A2 | 6/2007 |

OTHER PUBLICATIONS

Partial European Search Report dated Feb. 11, 2011 issued in European Publication No. EP 10275046.0.

UK Search Report dated Aug. 18, 2010 issued in GB1006677.7.

International Preliminary Report on Patentability and Written Opinion, dated Nov. 1, 2012 from related International Application No. PCT/GB2011/050822.

* cited by examiner

FLIGHT PLANNING METHODS AND SYSTEMS

FIELD OF EMBODIMENTS OF THE INVENTION

Embodiments of the invention relate to flight planning methods and systems.

BACKGROUND TO EMBODIMENTS OF THE INVENTION

Fixed wing aircraft are judged to be low flying when they are less than 2000 feet from the ground. Light propeller driven aircraft and helicopters are judged to be low flying below 500 feet from the ground during the day and below 2000 feet at night. To manage low flying traffic density and increase flight safety, an authority divides the UK into defined Low Flying Areas (LFAs). The operating heights and areas used prevent reliable radar or radio coverage or provision of Air Traffic services. Users can book area entry/exit times and locations via a centralised booking cell, or in some cases a controlling authority. Booking requirements are designed to manage traffic density and provide an audit trail, for example in the case of low flying complaints or incidents. During the day, users are invariably unaware of any other booked users' detailed routes or timings. At night, users should be aware of others' intended general routing and outside timings, such as, for example, approximate times for entry into and exit from a certain area.

There are a number of bases from which low flying activity may be coordinated. Flight activity planned by a base may be publicised by the base to one or more other bases. Typically a base may provide details of flight plans to other bases chosen by that base. A base may even choose not to share details of flight plans with other bases. An attempt is also made in the base to analyse any potential areas and/or times of conflicts with plans from the same base or flight activity information received from other bases. A conflict may be, for example, where plans and other information indicate that two aircraft may come to within a short distance from each other.

Plans made available by various bases vary in their format, level of detail and provision method. For example, some bases may provide more detail on their planned activity than other bases. Some bases may provide information on their planned activity in an electronic format, and others may provide information in another format, such as sketches, faxes, or using the telephone. As a result, it is difficult for a base to identify conflicts between plans of that base and plans of other bases.

If a conflict with a plan from another base is identified, a base typically changes its plan, but does not provide information on the changes. Therefore, other bases may be unaware of the new plan. Furthermore, late changes to a flight plan may result in new conflicts, and it may take considerable time to review flight plan changes and identify the new conflicts.

The lack of information exchanged between bases, and the potential for errors when determining conflicts, may increase the risk of air-to-air collisions or proximity incidents.

SUMMARY OF PREFERRED EMBODIMENTS OF THE INVENTION

From a first aspect, the present invention resides in a method, such as for example a computer-implemented method, of operating an electronic flight planning system for aircraft, the method comprising:

receiving as data input to the system from one or more users a plurality of flight plans, each flight plan defining a flight by one of a plurality of aircraft;

determining, for each flight by one of said plurality of aircraft, as defined in the respective received flight plan, a three-dimensional region of potential conflict, representative both of an uncertainty in the position of the aircraft and of a region of air exclusion appropriate for the aircraft or for the respective received flight plan; and determining, on the basis of the determined regions of potential conflict, whether any one of the received flight plans is in conflict with any one of the other received flight plans.

Thus, a method is provided that can provide users (such as, for example, pilots, flight planners, mission planners, bases and/or other users) with means for submitting a flight plan which is then compared with other flight plans (such as, for example, those previously submitted by the same or other users) in order to determine whether the submitted flight plan conflicts with any of the other flight plans. As a result, a method is provided that can be used to ensure that there are no conflicts between any flight plans or any users, or ensure that any conflicts are acceptable or intended, or ensure that knowledge of any conflicts is gained before flights according to the plans go ahead.

Embodiments of the invention may allow users to become more aware of other aircraft and their expected positions, any potential conflicts with other aircraft, and the like. This may be used, for example, to create a flight plan or revise an existing flight plan to avoid or resolve conflicts or to ensure that any conflicts are acceptable or indicated to a user such as a pilot or crew. As a result, the likelihood of actual conflicts between flying aircraft may be reduced. This may be the case even in the absence of other detection systems such as ground-based radar.

In some embodiments, the method comprises sending one or more conflicts determined for a flight plan to a user associated with the flight plan. Therefore, a user that submits a flight plan can view the conflicts between that flight plan and other flight plans. The conflicts may be displayable, for example, as a list of the conflicts or a map including graphical representations of the conflicts and of one or more of the flight plans. This allows the conflicts to be easily and quickly understood by the user. The graphical representations could be displayable including a graphical representation of aircraft on its flight plan at a time that is predetermined or selected by a user. Thus, the user can view conflicts at selected times during the flight plan associated with that user, for example. The user could, for example, user a slider control to control the selected time between the start and end times of the user's associated flight plan or between other times, and conflicts at the selected time could be displayed to the user. A graphical representation of an aircraft at the expected time may help to visualise the expected positions of any aircraft at or near the time of a conflict. The graphical representation of a flight plan may be interactive such that interaction with the graphical representation initiates communication between a user and another user associated with that flight plan. Thus, for example, a user may contact another user quickly and easily if flight plans associated with the users have conflicts.

In some embodiments, the method comprises sending a notification to one or more users associated with flight plans for which conflicts with other flight plans are determined. Thus, for example, the user has knowledge that the user's associated flight plan conflicts with other flight plans. This may be the case even after the user has submitted a flight plan and no conflicts are determined. For example, the notification may comprise a SMS message, email or other message. In embodiments of the invention where the method is implemented using a software application, the user may be informed of conflicts even when the user is no longer using the software application, for example.

In some embodiments, the method comprises sending expected positions of one or more aircraft at a current, predetermined or selected time to a user based on one or more of the flight plans. As a result, a user may be able to create a flight plan that takes into account of existing flight plans from other users, or obtain awareness of current expected positions of aircraft.

In some embodiments, conflicts between two flight plans are determined where the flight plans indicate that respective aircraft will be simultaneously within a predetermined region and/or will move to within a threshold distance and/or altitude of each other.

From a second aspect, the present invention resides in a method, such as for example a computer-implemented method, of flight planning, comprising generating data representing a flight plan, sending the flight plan to an electronic flight plan repository server, and receiving information on conflicts between the flight plan and one or more other flight plans from the flight plan repository server. Thus, a user can submit a flight plan and be informed if the flight plan conflicts with other flight plans from the same and/or different users.

In some embodiments, the information may comprise a list of conflicts, a SMS message, an email message, other message, and/or a graphical representation of the flight plan and/or the one or more other flight plans.

The method may further comprise generating and sending a revised flight plan to the flight plan repository server. Therefore, any updates to a flight plan (for example for resolving conflicts) can be made available.

The method may also comprise receiving expected positions of one or more aircraft at a current, predetermined or selected time based on the flight plan and the one or more other flight plans. Therefore, expected positions of aircraft and times may be viewed to aid in determining conflicts and their locations and times.

In some embodiments, the information on conflicts indicates that aircraft associated with the flight plan and one of the other flight plans respectively will be simultaneously within a predetermined region and/or will move to within a threshold distance and/or altitude of each other.

From a third aspect, the present invention resides in a method, such as for example a computer-implemented method, of operating an electronic flight planning system, the method comprising receiving as data input at the system flight plans transmitted from a plurality of remote users; receiving as data input at the system a flight plan inspection query transmitted from a remote user, the flight plan inspection query including one or more inspection criteria; determining flight plans information from said flight plans data in accordance with said one or more inspection criteria; and transmitting said flight plans information to the remote user. The one or more criteria may include a specified time and/or a specified location and/or a specified aircraft type.

Other aspects of preferred embodiments of the invention are defined in the claims and include an apparatus comprising means for carrying out the method of the first and second aspects, a computer program comprising computer readable instructions for carrying out the method of the first and second aspects, and computer readable storage storing the computer program.

BRIEF DESCRIPTION OF THE FIGURES

Embodiments of the invention will now be described by way of example only with reference to the figures, in which.

DETAILED DESCRIPTION OF PREFERRED EMBODIMENTS OF THE INVENTION

In summary, preferred embodiments of the present invention provide methods and apparatus for flight planning for aircraft. In particular, preferred embodiments provide for a central flight planning system applicable to low-flying areas, the system being accessible, with appropriate user access and security controls, over a public network such as the internet, or over another type of network accessible by users of the system. An interface is provided to enable users to upload pre-prepared details of proposed flight plans in an agreed format, for example as generated within an electronic flight planning system, and an interactive user interface is provided to enable users to define the details of proposed flights or to edit previously saved details.

The flight plans proposed by all or selected users may be viewed at the user interface, including those active at a particular time or over a particular time interval The user interface may provide a choice of mapping and access to other information sources to enable easy entry and representation of key flight plan details. Furthermore, the system incorporates means for automatically identifying potential conflicts in proposed flight plans and a particularly effective means for representing flight plans and their potential conflict at the user interface.

A user may be, for example, a pilot, a member of a crew, an air base, a flight coordinator for an air base or civilian air field, or some other individual, group or organisation. An aircraft may be a fixed-wing aircraft, helicopter or similar.

Preferably, a flight plan will comprise at least an indication of one or more waypoints sufficient to define a flight path within a given region, information on the proposed timing of the flight, the expected speed of the aircraft and the anticipated altitude/height above ground. The waypoints may be defined in terms of map references or place names that can be located on a map. However, in practice, a flight plan is likely to be defined more comprehensively, taking account not only of the type of aircraft, from which air safety parameters may be inferred, but also the preferred method of flight plan representation and preferred communications channel, naming a contact point in the event of conflict.

Figure 1:
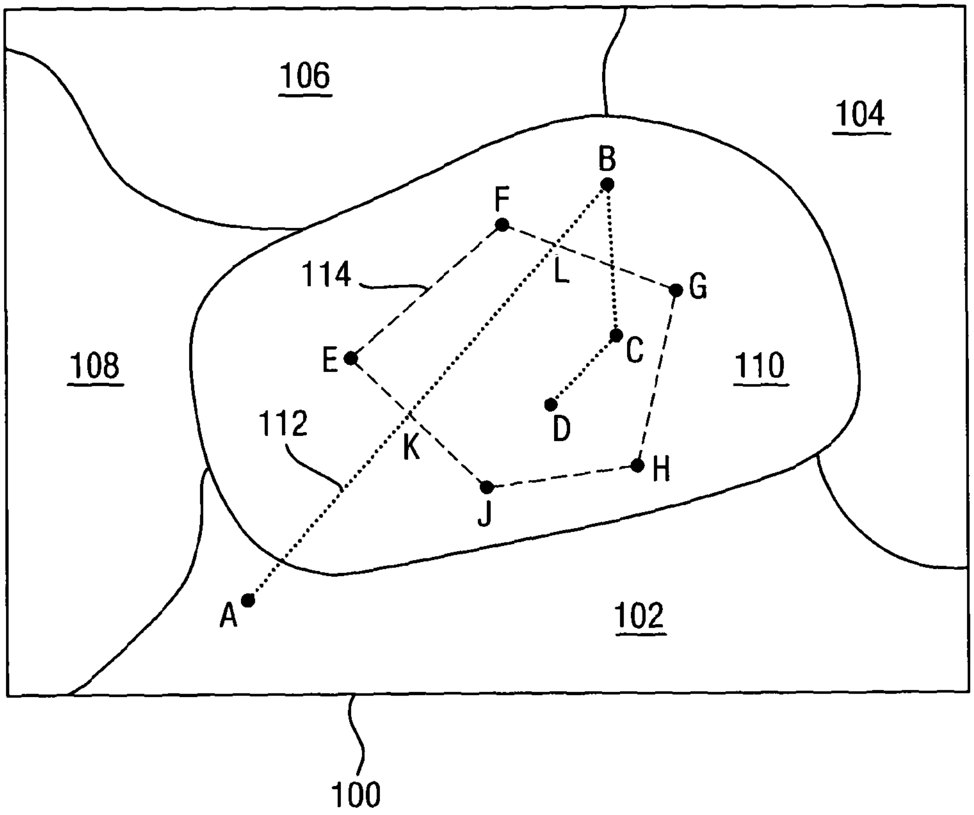
FIG. 1 shows an example of a map including a plurality of low flying areas (LFAs) and the flight paths proposed according to two flight plans.

FIG. 1 shows a simplified example of a map 100 including five low flying areas (LFAs) 102, 104, 106, 108 and 110. A first flight plan indicates a first flight path (illustrated by dotted line 112) whereby an aircraft will take off at a first point A in a first LFA 102, fly to points B and C in a second LFA 110, and land at point D. A second flight plan indicates a second flight path (illustrated by dashed line 114) whereby another aircraft will take off from a point E in LFA 110, and fly to points F, G, H and J before landing again at the starting point E.

It should be noted that in some embodiments of the invention geographical areas such as LFAs may not be present or may be disregarded.

In other embodiments of the invention, certain details such as takeoff and landing points may be disregarded or not important or relevant. For example, embodiments of the invention may be concerned with flight planning for the region 110 shown in FIG. 1. For the flight plan 112, the take off point A is outside of the region, and therefore is not considered by the flight planning system. In some embodiments, the take off point A may not be provided to the flight planning system. Instead, the point X where the associated aircraft enters the region 110 may be provided to or used by the flight planning system. Similarly, where the landing point is outside of the region 110 or an aircraft leaves then re-enters the region 110, the associated entry and/or exit points may be provided to the flight planning system.

The flight plans describing the first and second flights may also include times at which the respective aircraft associated with each flight plan will take off, reach the designated points on the flight path (such as points B, C, F, G, H and J for example) and land, and/or the planned altitude of an aircraft at or between each point. Therefore, embodiments of the invention are able to determine from the flight plans the expected positions of aircraft throughout their planned flights. From this, embodiments of the invention may calculate the expected distance between aircraft during their planned flights, and thus determine if there will be any conflicts between flight plans. For example, a conflict may be determined where two aircraft are expected to fly to within a certain distance from each other, pass near a certain point or region within a certain window of time, or carry out some other incident that may present an unacceptable risk of a collision or proximity incident, or some other risk. In some embodiments, whether a conflict is determined also depends on other factors such as aircraft type and/or weather conditions. For example, the flight planning system may be aware that it is acceptable for certain types of aircraft to fly closer to each other, and therefore a conflict is only determined for a reduced potential distance between two aircraft compared with other types of aircraft.

The key components of a flight planning system according to one preferred embodiment of the present invention will now be described in more detail with reference to FIG. 2.

Figure 2:
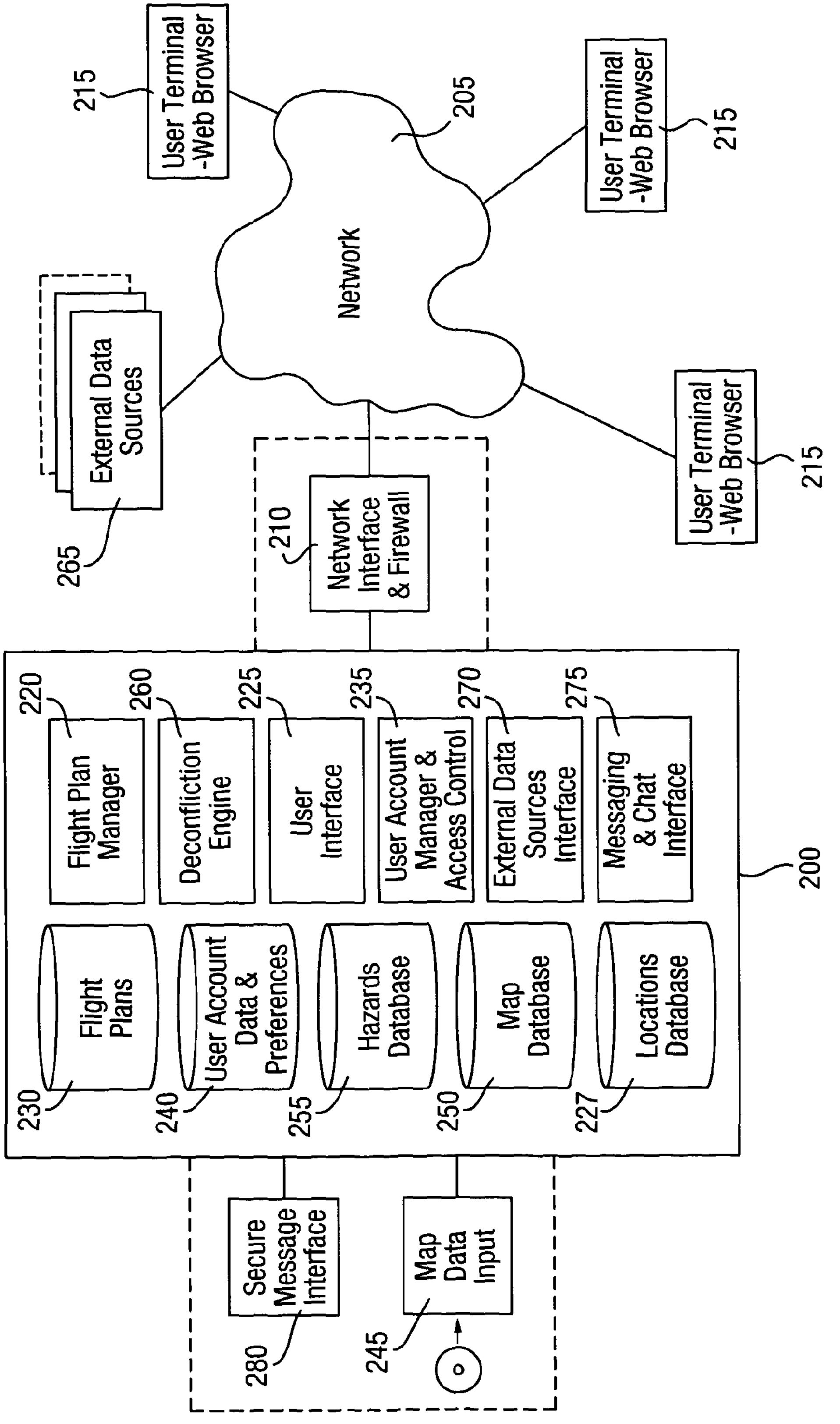
FIG. 2 shows a preferred embodiment of a flight planning system.

Referring to FIG. 2, a flight planning system comprises a flight planning server 200 linked to a network 205, such as the public internet, by means of a network interface and firewall 210. Users may access the flight planning server 200 over the public network 205 from user terminal equipment 215 running compatible internet browser software, such as Internet Explorer (Microsoft Corporation), Safari (Apple Inc.), FireFox (Mozilla Corporation) or Chrome (Google Inc.).

The flight planning server 200 incorporates a number of software modules to implement the functionality of the flight planning system. The server is also provided with data storage for use by the various software modules as they execute on the server 200. In particular, a flight plan manager module 220 is provided to implement overall control for the functionality of the flight planning system. The flight planning manager 220, through a user interface 225, controls the flight planning functionality that will be made available to users (215). A flight plan store 230 is provided for use by the flight plan manager 220 to enable the storage and retrieval of current flight plan data and to enable users to record all or selected data defining "favourite" or routine flight plans likely to be used again in the future.

A user account manager and access control module 235, with reference to a user accounts and preferences store 240, controls user access to the system. The user account management functionality of this module 235 enables the creation and administration of user accounts for permitted users. The access control functionality provides, through the user interface 225, a conventional login procedure involving the validation of a user-entered identifier and password and the establishment of an interactive, preferably secure (using the secure HTTP protocol for example), communications session between the user's terminal equipment 215 and the server 200 over the network 205. Those facilities that a user is permitted to access are controlled by this module 235 according to respective permissions recorded in the user's account (240). Through this module 235, a user (215) is also able to record preferences for their use of the system, for example in the way flight plan data are presented at the user interface 225, including:

Default map type and scale;
Default map/symbology contrast;
Default start location for new flights;
Default aircraft type for new flights.
Default channel for communications (e.g. for delivery of conflict alerts, for access to flight plan information)

Further types of user preference information may also be stored relating to the type of aircraft selected, including preferred speed and altitude. User preference data may be retrieved from the user accounts and preferences store 240 and used to pre-fill respective fields on the user interface 225 at the time of flight plan entry. The user may alter values where they differ for a current flight plan. Where necessary, the plan management functionality will access library information held for a specified aircraft type, where not supplied by a user and where necessary for determining the likelihood of conflict between flight plans.

The user interface 225 is arranged not only to display details of flight plans already defined, but also to enable a user to input a flight plan or to recall and edit a previously stored (230) "favourite" flight plan. Flight path entry can be simply achieved at the user interface 225 by clicking waypoints on a presented map, or by entering map references, etc. A searchable locations database 227 is provided containing details of key locations and features to facilitate rapid entry of flight plan details. Data may be obtained under appropriate licenses from various global information sources, including those managed by the National Geospatial Intelligence Agency in the USA, and data issued by civil and military air information sources. The searchable database 227 may include, for example:

Digital Aeronautical Flight Information Files (DAFIF)—listed Airports
DAFIF-listed Heliports
Towns, villages and major landmarks
"Favourite waypoints"
User-definable local features (e.g. fields, control points)

Flight plans created externally, for example in an electronic mission planning system, may be imported under the control of the flight plan manager 220 if they conform to one or more agreed formats, including XML and comma-separated fields (CSV).

A key element in the visualisation and input of a flight plan is the map on which a flight path for a proposed flight is defined. A variety of different types of map view may be made available to users, including most of the maps types used by those carrying out low-level flying, including, but not limited to:

DAFIF v7 and v8
NOTAMS
Digital Vertical Obstruction Files (DVOF)/XVOD
Digital Terrain Elevation Data (DTED)
ARC Standard Raster Product (ASRP) image data
Controlled Image Base (CIB) map data
Compressed ARC Digitised Raster Graphics (CADRG) map data
Geo-referencing metadata in the GeoTIFF format
Keyhole Markup Language (KML) geographic data A zoom feature is provided at the user interface 225 to enable closer examination of a particular region of a low-flying area, and viewing of larger scale map information.

A map media input 245, preferably a DVD reader or an interface for other suitable map media or map data input channels is provided. Preferably, as licensing arrangements permit, maps in the formats listed above may be uploaded for storage in a mapping database 250 for more rapid retrieval. Updates from map data sources may be supplied at regular intervals and uploaded by means of the appropriate map media or map data input channel 245.

Included in the list above are sources of map data supplemented with details of known hazards. Preferably, hazard data may be stored in a separate hazards database 255 so that hazard details may be overlain on the user's map of choice. Hazard data may be uploaded as for the map data, with regular updates, or it may be downloaded over the network 205 from known external data sources 265 by means of an external data sources interface 270. However, for increased security, it is preferred that such data are obtained by a more secure data channel and uploaded onto the server 200 for storage in the hazard database 255 so that such data remain behind the firewall 210.

The user interface 225 may also provide facilities for users to enter and store details of other hazards known to them, not shown in "official data", that should be shared with other users. Examples may include wires stretched across valleys, locally exceeding the usually expected 100 feet in height above the ground, or privately installed wires and masts.

Route control factors may be entered by a user or derived from other user-entered data. For example, timing of arrival at intermediate points on a route may be derived from planned speeds, or speeds may be derived from planned timings. A basic wind model may be provided to enable ground and air speeds to be related. En-route delays may be entered, for example to allow for hovering over a waypoint (if the aircraft is a helicopter) or for a period of circling over an airfield before moving on to the next waypoint.

Defined flights, for example training flights from a particular airbase which are likely to be repeated, may be saved into a personal or shared library within the flight plans database 230. A flight plan for a flight, once entered may be published and thereby made available to other users. The ability for users to share certain details of proposed flight plans through the present invention is particularly beneficial. The data that can be shared includes, but is not limited to:

Callsigns
Routing
Timings
Aircraft Type & Quantity
Crew

Users have the ability to selectively inspect all planned flights as a list filtered according to user-controlled criteria. Users can also selectively display all planned flights drawn on an user-selected map. The flight plan manager 220 enables a user to view some or all of the other flight plans that relate to a particular low-flying area in a given period of time, according to the permissions associated with that user's account. Having visibility of all the flight paths over a period of time enables users to see for themselves where potential conflicts may arise. However, the flight planning system of the present invention incorporates a flight plan deconfliction engine 260 designed to identify, automatically, and to highlight potential conflicts in proposed flight plans. The deconfliction engine 260 may be triggered to identify conflicts when a user completes entry of flight plan details and commits the plan to the server for sharing with other users of the system. At that point the deconfliction engine 260 operates on all the committed flight plans to identify any potential conflicts, highlighting potential conflicts at the user interface 225. A preferred method of operation of the deconfliction engine 260 will be described in more detail below.

Users may be provided with facilities to help in the self-deconfliction of flight plans. For example, a built-in messaging service is provided, controlled by a messaging and chat interface module 275, that enables users to communicate with each other for the online coordination of flight conflict resolution, announcement of last-minute changes to plans and last-minute locale-specific restrictions or changes, e.g. the closure of an airfield for some reason. A messaging board is provided at the user interface 225 in which a user may enter typed messages for sending and receive messages from other users. The message communications interface may take the form of a conventional electronic mail messaging scheme or an instant messaging (chat) scheme.

If required, a secure messaging interface 280 is provided, not only for the communication of messages between users, but also for the secure notification of sensitive information.

In representing potential conflicts at the user interface 225, a number of innovations have been made in the present invention, not only to enable users to see clearly the conditions under which a potential conflict may arise and to take steps to resolve the conflict in conjunction with other users, but also to enable the automatic detection and highlighting of potential conflicts. In particular, the method of representing, at the user interface 225, the anticipated position of an aircraft at a given time is considered particularly advantageous, as will be now be discussed.

A flight plan preferably identifies the aircraft type being used in a flight, the flight path to be followed on the flight, represented in two dimensions in terms of waypoints or features on a map, the user's anticipated flight speed and altitude, and a proposed start time for the flight. Preferably, certain reference data may be stored for each of the known aircraft types, defining for example the extent of an air safety exclusion zone for the aircraft of that type, typically 0.25 nautical miles horizontally, 500 feet vertically and a 2 minute separation in flight time. Different parameter values may be defined by aircraft type, so that slower flying helicopters may be subject to a shorter horizontal separation than fast jets. However, whilst such values may be recorded as default values per aircraft type, in practice it may be desirable each of these parameters may also be set by flight. This would allow for special consideration to be given to Royal flights, for example, that may justify a wider horizontal separation zone and wider tolerance on flight time Finer details, such as the balance of fore and aft air exclusion to be applied for that aircraft type may also be defined if appropriate. With this reference information and the information supplied by the user in their proposed flight plan, the flight plan manager 220 may calculate the length and diameter of a three-dimensional region of potential conflict for that aircraft when executing that particular flight plan. The three-dimensional region of potential conflict is preferably in the shape of a square sectioned "sausage" with rounded ends (when viewed from above) and takes account not only of the uncertainty in the position of an aircraft at any given time, but also the air safety exclusion zone applicable to that aircraft type and the particular circumstances of the flight as it travels along it's proposed flight path. The flight plan manager 220 may also determine, for any selected time within the interval specified in the flight plan, the position and orientation of the region of potential conflict, according to the determined position and direction of flight of the aircraft at that time, such that it may be overlain on a map being displayed by the user interface 225 of a type and at a scale selected by a user.

Preferably, the length of the region or potential conflict for the purposes of determining conflict between two or more flight plans depends upon the tolerance level applied to the time estimates in the flight plan and the proposed or determined ground speed of the aircraft, the latter, if necessary, being derived from the proposed air speed and an estimate of the strength and direction of wind in a wind model. Of course, the length of the potential conflict region determined on this basis is subject, as a minimum, to the size of the fore and aft air safety exclusion zone for the type of aircraft in question and the nature of the flight.

Advantageous features in the depiction of flight paths at the user interface 225 will now be described with reference to FIG. 3 in which a screen-shot from the user interface 225 of a relatively simple scenario is presented.

Figure 3:
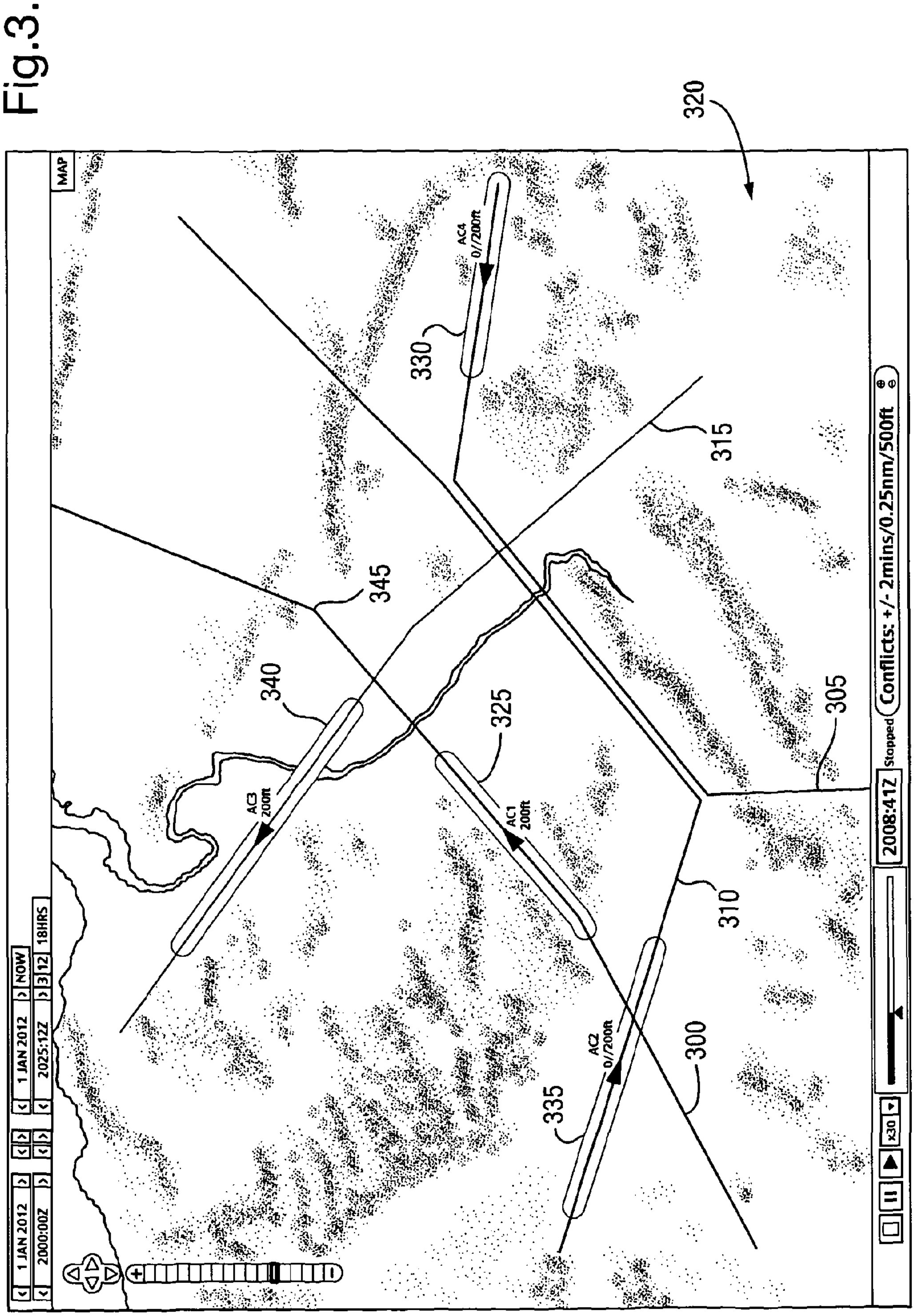
FIG. 3 shows preferred representation of flight paths by the user interface in the flight planning system.

Referring to FIG. 3, a section of a low flying area is shown with sections of four different proposed flight paths 300, 305, 310, 315 overlaying a user's map of choice 320. In depicting the flight paths 300-315, the user interface 225 represents each flight path using a different coloured line. Flight paths may be shown, optionally, without reference to their timing, but a user may elect to view only those flight paths expected to be active at a selected time or during a selected time interval. This is the view presented in FIG. 3 in which the proposed active flight paths are represented for the time interval 20:00 to 20:25 on 1 Jan. 2012. At a selected time within that interval, the flight plan manager 220 has determined the position and orientation of a region of potential conflict associated with each aircraft likely to be in the air at that time. These regions are represented at the user interface 225 in two dimensions, shown as regions 325, 330, 335 and 340 in FIG. 3 as wider elongate sections in the respective flight paths 300-315 corresponding to the currently expected positions of the aircraft. The size of each region 325-340 is according to the scale of the map, and is preferably shown in the same colour as the respective flight path 300-315. Other useful information relating to the flight plan may be displayed at key points, e.g. adjacent to waypoints along the flight path. Such information may include a unique flight plan identifier and the expected altitude of each aircraft at the selected time, as shown in FIG. 3. However, further data may be provided, for example if the user moves their cursor over any shown flight path 300-315 or over any specific part of a flight path such as the region of potential conflict 325-340 or for example over a waypoint 345 in the flight path 300.

The user is able to run an animated simulation of all the active flight plans over a given area starting at a selected time to see how they evolve and to see clearly where and when regions of potential conflict 325-340 actually arise, in this example during the 25 minute time interval 20:00 to 20:25. The deconfliction engine 260 may operate during the simulation of the flight plans to highlight potential conflicts as they arise, for example by colouring one or both respective regions of potential conflict red and providing further information on screen, for example the time and duration of the conflict and other useful data from the respective flight plans at that time. Useful data may include the call sign of each aircraft, the types of aircraft involved in the conflict and a flag to indicate whether or not each of the users responsible for planning the respective flights have confirmed that they are aware of the potential conflict, for audit purposes. With all the known hazards marked on the map, the proximity of hazards may also be readily seen and automatically highlighted by the deconfliction engine 260. The user is then able to see how amendments may be made to deconflict the flight plans and to identify whom to contact if necessary to negotiate adjustments to the conflicting plans.

For greater efficiency, the user may step directly to an already identified time of conflict and view a graphical representation of the situation at that time.

Besides providing a graphical view of potential conflicts, the user interface 225 may also provide a list of conflicts including the times and locations of those conflicts, and an option to download that list. Users are required to acknowledge each potential conflict arising in connection with a flight plan that they are responsible for, should they decide to proceed with their flight plan unaltered. Preferably this acknowledgement may be made by each of the users responsible for the conflicting flight plans through a verified confirmation step triggered by the user clicking on a button provided alongside each listed conflict. Details of the user's identity and acknowledgement, together with any explanatory notes, are recorded by the flight planning manager 220 for audit purposes. A user may merely use knowledge of the conflicts to take other precautions, particularly if, for example, visual contact between two aircraft is sufficient to avoid a mid-air collision. Knowledge of a potential conflict may allow aircraft to obtain visual contact more easily and/or quickly. In some situations, conflicts may be desired, for example during in-flight refueling, but acknowledgement is nevertheless required.

A preferred technique by which the deconfliction engine 260 may identify conflict between proposed flight plans will now be described in more detail with reference to FIG. 4.

Figure 4A:
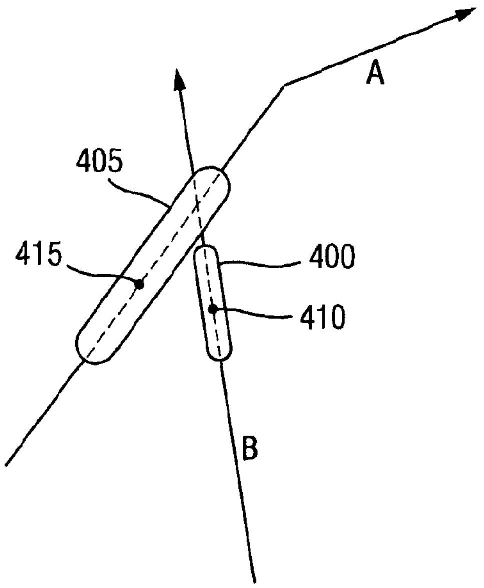
FIG. 4 shows a preferred representation of aircraft position in the form of regions of potential conflict.

Referring firstly to FIG. 4*a*, a two-dimensional representation is shown of a portion from each of two aircraft flight paths A and B a short time before a potential conflict occurs, as may be depicted at the user interface 225 in a similar manner to FIG. 3. Regions of potential conflict 400, 405 associated with each aircraft are shown aligned to each aircraft's direction of flight at that particular time and at the current determined positions 410, 415 respectively for each aircraft.

Figure 4B:
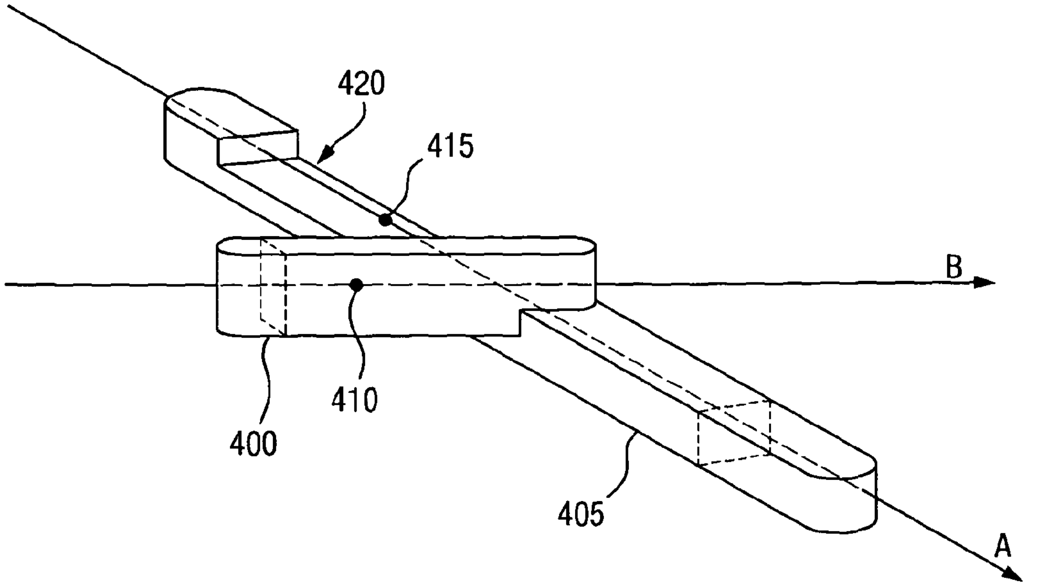

Referring to FIG. 4*b*, the same two flight paths A and B are shown, in a representation of a three-dimensional view, at a slightly later time when the two regions of potential conflict 400, 405 begin to overlap. Note that the height of the region of potential conflict 400 associated with flight path B is greater than that of the region of potential conflict 405 associated with flight path A. This is because a greater vertical separation has been specified for the aircraft flying along flight path B. Furthermore, the aircraft flying along flight path B is intended to fly at a greater altitude than that flying along flight path A. The region of overlap, as time proceeds, is shown for convenience as a cut-away portion 420 of the region of potential conflict 405. The extent of the overlapping portion may be calculated by the deconfliction engine 260 using conventional three-dimensional geometric methods as would be apparent to a person of ordinary skill in the relevant art when presented with this scenario. In order for a conflict to arise, the position of one aircraft along its flight path of must fall within the region of potential conflict of another aircraft. In the example shown in FIG. 4*a*, the region of overlap 420 can be seen to expose a section of the flight path A on which the respective aircraft can be found at some time during the period of the overlap, even though the line of the flight path B—due to its sufficiently greater altitude—at no time falls within the region of potential conflict 405 associated with the flight path A. The determined positions 410, 415 of the two aircraft may not necessarily coincide at any time, but taking account of the possible variation in the actual time of arrival of each aircraft at any particular point, their altitude, speed and the margin of safety required of the respective aircraft types and of the respective flights, the potential for conflict can clearly be seen from this representation.

Figure 4C:
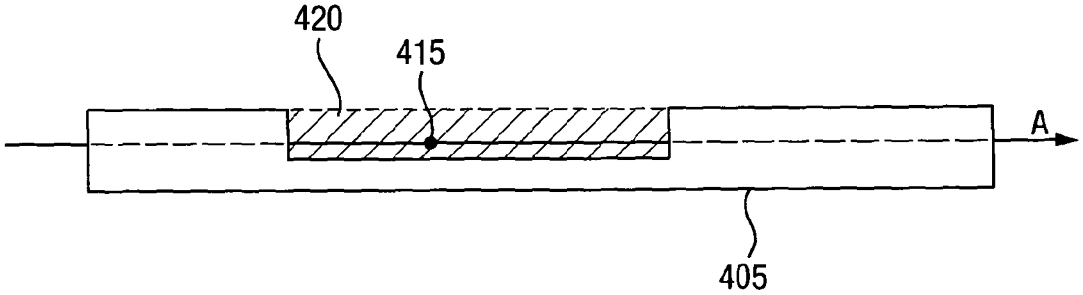

FIG. 4*c* shows the region of potential conflict 405 in a side view, with the overlapping region 420 removed. The length of the overlapping region 420 represents an interval in time from a time t1 of first contact between the regions of potential conflict 400, 405 to a time t2 of last contact between those regions. The position of the aircraft on flight path A within its region of potential conflict 405 can clearly be seen to lie within the overlapping region 420, indicating that it will at some calculable time during the interval t1 to t2 fall within the region of potential conflict 400.

In the two-dimensional representation shown in FIG. 4*a*, the deconfliction engine 260 is arranged to colour the conflicting regions of potential conflict red to highlight the conflict at the user interface 225.

There are a number of different methods that may be implemented by the deconfliction engine 260 for determining the times and the positions in three-dimensions at which one aircraft enters the region of potential conflict of another aircraft, as would be apparent to a person of ordinary skill in the field of three-dimensional geometry. Such different methods, while falling within the scope of the present invention would not necessarily be aligned to the particular representation of a conflict chosen in FIG. 4.

The deconfliction engine 260 may also determine whether there are any conflicts between one flight plan and other hazards, such as for example wires, towers or sources of potential conflict identified in NOTAMs (Notices To Airmen). A NOTAM may specify, for example, that a certain area must be avoided. A NOTAM may be raised or informed after a flight plan has been provided to the server 200. In this case, the deconfliction engine 260 may check previously stored flight plans for conflicts with a new NOTAM and inform respective users or other interested parties accordingly. In this way a user can be provided with up-to-date information on conflicts between flight plans associated with that user and other events, including other flight plans. Details of any conflicts may be included in a specific notification to a user, or such details may be retrieved when a user next consults the flight planning server 200.

The present invention may be used in the briefing of air crews—a mandatory activity—providing facilities to generate:

- Presentation slides of the planned flights through selected airspace for a given period of time. The slides produced represent time slices between a selected start time and a selected end time, for example in increments of 15 minutes.
- A dynamic play-through of planned routes over a selected map type, appropriate to the briefing requirements.

There are a number of different data processing platforms, user terminal equipment types, networks and information technology architectures that may be used to implement the flight planning system of the present invention, as would be apparent to a person of ordinary skill in this field. In the preferred embodiment described above, the following specific advantageous features may be included in the implementation:

- Centrally hosted server-based service available to any Internet-connected terminal running Internet Explorer 6, 7, or 8 (in compatibility mode).
- No additional software installation required on client's user terminal computer.
- May be developed to be fully compatible with specific information system standards applicable in user organisations.
- Maps and Charts are served on demand from the central flight planning server.
- All transfers over the internet are carried out using secure HTTPS protocols.
- Secured browsing using 256-bit encryption.
- The software implementing key features of the flight planning system has been developed in accordance with the UK Government's Communications-Electronics Security Group (CESG) published best practice.
- Servers may be hosted within a government-approved secure site.
- All user access is controlled via a multi-level privilege system.
- Regular backups and audits are performed to ensure ongoing integrity of data.

Figure 5:
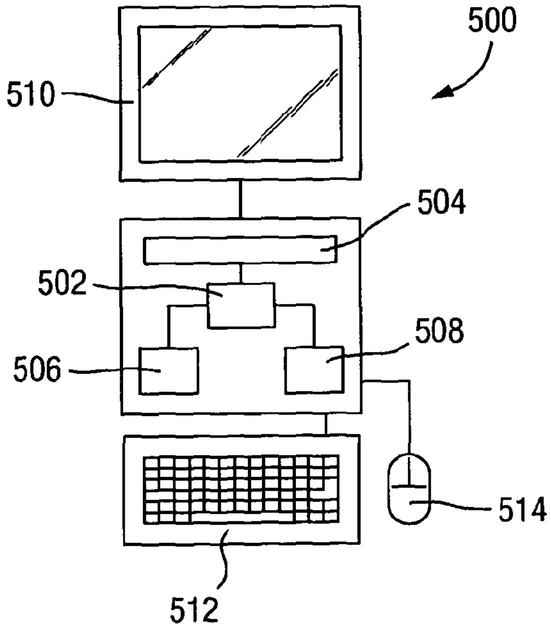
FIG. 5 shows an example of a user's terminal equipment suitable for use with preferred embodiments of the present invention.

Referring to FIG. 5, an example is shown of a user's terminal equipment 500 that may be suitable for accessing the flight planning system of the present invention. The user's terminal equipment 500 may comprise a data processing system having a central processing unit (CPU) 502 and a memory 504. The system may also include a permanent storage device 506 such as a hard disk, and/or a network device 508 for communications over a network such as the internet. Suitable internet browser software as detailed above may be installed in the hard disk for execution by the CPU 502. Furthermore, the system may include a display device 510 and human interface devices such as a keyboard 512 and/or mouse 514.

In embodiments of the invention, a user's terminal equipment 500 may comprise a single data processing system or it may comprise multiple data processing systems that are located locally or at remote locations. For example, multiple locally located data processing systems could be provided for performance and/or high availability in the event of a component failure, and multiple remotely located data processing systems could be provided for high availability in the event of building infrastructure failure, for example.

In embodiments of the invention, communications between any users and the flight planning system may be encrypted if desired.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Embodiments of the invention are not restricted to the details of any foregoing embodiments. Embodiments of the invention extend to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments that fall within the scope of the claims.

The invention claimed is:

1. A method of operating an electronic flight planning system for aircraft, the method comprising:

receiving as data input to the system from one or more users a plurality of flight plans forming a plurality of received flight plans, each received flight plan defining a flight by one of a plurality of aircraft;

determining, for each flight by one of said plurality of aircraft, as defined in the respective received flight plan, a three-dimensional region of potential conflict, representative both of an uncertainty in the position of the aircraft and of a region of air exclusion appropriate for the aircraft or for the respective received flight plan;

determining, on the basis of the determined regions of potential conflict, whether any one of the received flight plans is in conflict with any one of the other received flight plans; and before the flight of one of said plurality of aircraft, communicating the one or more conflicts to the users associated with said one or more conflicts.

2. The method according to claim 1, further comprising providing, at a user interface, a graphical representation of one or more of said plurality of received flight plans overlain on a map of a type selected by a user.

3. The method according to claim 2, further comprising representing details of one or more of said plurality of received flight plans as determined for a particular time selected by a user.

4. The method according to claim 3, further comprising representing, at a position determined for an aircraft on the selected map type at the selected time, the determined region of potential conflict surrounding the aircraft.

5. The method according to claim 2, further comprising representing the determined region of potential conflict overlain on a map of a type and at a map scale selected by a user, wherein the region of potential conflict is represented at the same scale as the map scale.

6. The method according to claim 2, further comprising providing at the user interface an animated simulation of the positions of the aircraft represented in two or more of said plurality of received flight plans and their determined regions of potential conflict, for a selected geographical region or over a selected time interval.

7. The method according to claim 2 wherein, in the event that a conflict is identified between a first flight plan and a second flight plan at a particular time, highlighting the conflict at the user interface and providing to the user responsible for the first flight plan details a user contact point for the second flight plan.

8. The method according to claim 2 wherein, in the event that a user determines to pursue a flight plan, without alteration, for which a conflict has been identified, capturing at the user interface an auditable record of an acknowledgement by the user of the conflict.

9. The method according to claim 2, further comprising providing, at the user interface, a list of the conflicts identified between flight plans of said plurality of received flight plans and providing means for a user to download the list of conflicts from the system.

10. The method according to claim 2, further comprising providing, at the user interface, means for communicating messages with another user responsible for a conflicting flight plan.

11. The method according to claim 1, wherein a conflict is identified when it is determined that, at a particular time, the position of a first aircraft executing a first of said received flight plans will make contact with or lie within a region of potential conflict determined for a second aircraft executing a second of said received flight plans.

12. The method according to claim 1, further comprising:

receiving as data input to the system a flight plan inspection query transmitted from a remote user, the flight plan inspection query defining one or more inspection criteria;

determining flight plans information from said plurality of received flight plans in accordance with said one or more inspection criteria; and transmitting said flight plans information to the remote user.

13. The method according to claim 12, wherein the one or more inspection criteria include a specified time and/or a specified location and/or a specified aircraft type.

14. A computer program product comprising a computer-readable medium having stored theron, or when arranged to store, computer-readable instructions which when loaded into and executed by a computer cause the computer to implement the method according to claim 1.

15. Apparatus for operating an electronic flight planning system for aircraft, comprising:

means for receiving as data input to the system from one or more users a plurality of flight plans forming a plurality of received flight plans, each received flight plan defining a flight by one of a plurality of aircraft;

means for determining, for each flight by one of said plurality of aircraft, as defined in the respective received flight plan, a three-dimensional region of potential conflict, representative both of an uncertainty in the position of the aircraft and of a region of air exclusion appropriate for the aircraft or for the respective received flight plan;

means for determining, on the basis of the determined regions of potential conflict, whether any one of the received flight plans is in conflict with any one of the other received flight plans; and before the flight of one of said plurality of aircraft, communicating the one or more conflicts to the users associated with said one or more conflicts.

* * * * *

UNITED STATES PATENT AND TRADEMARK OFFICE

CERTIFICATE OF CORRECTION

PATENT NO. : 8,918,271 B2
APPLICATION NO. : 13/642748
DATED : December 23, 2014
INVENTOR(S) : Pendry et al.

It is certified that error appears in the above-identified patent and that said Letters Patent is hereby corrected as shown below:

Title Page, Item (75) Inventor is corrected to read:
-- Steven Pendry, Somerset (GB);
Timothy Hood, Dorset (JP);
Adrian Christopher Hubbard, Somerset (GB) --.

Signed and Sealed this
Twelfth Day of April, 2016

Michelle K. Lee

Michelle K. Lee
*Director of the United States Patent and Trademark Office*

UNITED STATES PATENT AND TRADEMARK OFFICE

CERTIFICATE OF CORRECTION

PATENT NO. : 8,918,271 B2
APPLICATION NO. : 13/642748
DATED : December 23, 2014
INVENTOR(S) : Pendry et al.

It is certified that error appears in the above-identified patent and that said Letters Patent is hereby corrected as shown below:

Title Page, Item (75) Inventor is corrected to read:
-- Steven Pendry, Somerset (GB);
Timothy Hood, Dorset (GB);
Adrian Christopher Hubbard, Somerset (GB) --.

This certificate supersedes the Certificate of Correction issued April 12, 2016.

Signed and Sealed this
Third Day of May, 2016

Michelle K. Lee
*Director of the United States Patent and Trademark Office*